United States Patent [19]

Dawes et al.

[11] Patent Number: 5,418,194

[45] Date of Patent: May 23, 1995

[54] COATED INORGANIC FIBER REINFORCEMENT MATERIALS AND CERAMIC COMPOSITES COMPRISING THE SAME

[75] Inventors: Steven B. Dawes, Corning; John L. Stempin, Beaver Dams; Dale R. Wexell, Corning, all of N.Y.

[73] Assignee: Corning Incorporated, Corning, N.Y.

[21] Appl. No.: 512,393

[22] Filed: Apr. 23, 1993

[51] Int. Cl.$^6$ .............................................. C03C 3/145
[52] U.S. Cl. ...................................................... 501/52
[58] Field of Search ........................................... 501/52

[56] References Cited

U.S. PATENT DOCUMENTS 4,935,387  6/1990  Beall et al. ................................ 501/3
4,948,758  8/1990  Beall et al. ................................ 501/3

*Primary Examiner*—Peter A. Nelson
*Attorney, Agent, or Firm*—Kees van der Sterre

[57] ABSTRACT

Inorganic reinforcing fibers provided with a multi-layer protective coating comprising a boron nitride sublayer and an oxide-based overcoating of alumina or synthetic mica, and fiber-reinforced ceramic matrix composite products incorporating the protectively-coated fibers, are disclosed. The fibers offer improved oxidation resistance and good compatibility with oxide-based glass and glass-ceramic composite matrix materials.

9 Claims, No Drawings

COATED INORGANIC FIBER REINFORCEMENT MATERIALS AND CERAMIC COMPOSITES COMPRISING THE SAME

BACKGROUND OF THE INVENTION

The present invention relates to inorganic composite materials of the class generally known as fiber-reinforced ceramic matrix composite materials. The invention includes inorganic reinforcing fibers for such composites incorporating multi-layer protective coatings, and improved ceramic composites incorporating such protective coatings.

Fiber-reinforced ceramic matrix composites comprising glass-ceramic matrices are well known. U.S. Pat. No. 4,615,987 discloses silicon carbide fiber reinforced glass-ceramic composites wherein the matrix consists of an alkaline earth aluminosilicate glass-ceramic composition. Similar silicon-carbide-reinforced composites wherein the matrix consists of a barium-modified magnesium aluminosilicate glass-ceramic are reported in U.S. Pat. No. 4,589,900, while U.S. Pat. No. 4,755,489 discloses SiC-reinforced glass-ceramics wherein the glass-ceramic matrix contains excess $Al_2O_3$ and consists predominantly of anorthite in combination with mullite or alumina.

Prospective uses for fiber-reinforced ceramic matrix composites such as described in these and other prior patents and literature include use as a structural element in high temperature environments such as heat engines. Thus the materials to be employed must not only exhibit good strength and toughness at ambient temperatures, but must also retain those desirable physical properties at the elevated temperatures encountered in the operating environment. Temperatures in the range of 700°–1000° C. and highly oxidizing conditions (due to the high-temperature activity of oxygen) are considered representative of such operating conditions.

An important problem which has been identified in silicon carbide reinforced ceramic matrix composites in this temperature regime is that of high temperature embrittlement. After exposure to temperatures in the operation ranges desired, these initially tough materials become brittle and subject o sudden catastrophic breakage instead of the more gradual failure typical of the original material. While the exact mechanism o embrittlement has not been fully explained, oxidative deterioration of the fiber-matrix interface is the probable cause. See, for example, R. L. Stewart et al., "Fracture of SiC Fiber/Glass-Ceramic Composites as a Function of Temperature," in *Fracture Mechanics of Ceramics*, R. C. Bradt et al. Ed., Volume 7, pages 33–51, Plen (New York) 1986.

It is known to provide coatings on fiber reinforcement to be incorporated in composite materials in order to modify the behavior of the materials or the fibers therein. For example, U.S. Pat. No. 4,642,271 suggests boron nitride coatings for silicon carbide and other fibers for incorporation in ceramic matrix materials such as $SiO_2$, $ZrO_2$, mullite, and cordierite. In $SiO_2$ systems, high-temperature strength an toughness were improved utilizing SiC reinforcing fibers coated with BN, although this effect was not observed in all matrix systems.

Other coating systems and coating/matrix combinations are also known. U.S. Pat. No. 4,276,804, for example, describes carbon fibers coated with a metal oxide film intended to improve fiber adhesion and wetting by a molten metallic matrix material. U.S. Pat. No. 4,397,901 describes a composite wherein a woven or non-woven fiber substrate of carbon fibers is provided with a multi-layer carbon/silicon/silicon carbide coating to provide a composite article resistant to corrosive conditions. U.S. Pat. No. 4,405,685 describes a similar coating system for carbon fibers wherein an inner coating of carbon and a selected metal carbide with an outer coating of the metal carbide are used. This coating system is intended to provide enhanced fiber protection for fibers to be embedded in ceramic or particularly metal matrix materials.

U.S. Pat. No. 4,481,257 discloses silicon carbide monofilaments coated with boron or boron carbide and exhibiting improved strength and bonding when used with metal or epoxy matrix materials. U.S. Pat. No. 4,485,179 describes the use, in a ceramic matrix composite comprising silicon carbide fibers, of an agent added to the matrix to reduce interaction with the silicon carbide fibers. Tantalum or niobium compounds are useful for this purpose.

While the foregoing patents and literature indicate a general interest in the development of coatings for fibers to be employed for the reinforcement of composite glass, metal and ceramic materials, the problem of embrittlement of ceramic matrix composites comprising silicon carbide or other fibers remains.

It is therefore a principal object of the present invention to provide a fiber-reinforced ceramic matrix composite comprising inorganic reinforcing fibers which exhibits improved resistance to embrittlement under adverse high temperature conditions.

It is a further object of the invention to provide a method for making silicon carbide-reinforced glass-ceramic matrix composites which provides products of improved strength and/or toughness at high temperatures.

It is a further object of the invention to provide a novel and improved protective coating system for inorganic fibers utilized for ceramic matrix reinforcement, particularly glass-ceramic matrix reinforcement, and coated fibers incorporating the coating system.

Other objects and advantages of the invention will become apparent from the following description thereof.

SUMMARY OF THE INVENTION

The present invention is founded upon the discovery of a new multi-layer coating system for inorganic reinforcing fibers used for the reinforcement of ceramic materials. The multi-layer coatings of the invention provide an adherent and cohesive protective layer which is effective to preserve the inherent strength of reinforcing fibers such as silicon carbide fibers, while being physically and chemically compatible with both the fibers and common ceramic matrix materials including refractory glass and glass-ceramics.

In a first aspect, then, the invention includes a coated inorganic fiber material having a multi-layer protective surface coating, wherein the multi-layer surface coating comprises a boron nitride sublayer and an oxidic overcoating adhering to the sublayer. The boron nitride sublayer has a composition consisting essentially, in weight percent, of about 75–90% BN, 0–10% O and 0–14% C, while the oxide overcoating consists at least predominantly of an oxidic species selected from the group consisting of alumina and synthetic mica.

In another aspect, the invention includes a fiber-reinforced ceramic matrix composite article exhibiting high-temperature strength and toughness comprising a ceramic matrix selected from the group consisting of glasses and glass-ceramics in which are disposed inorganic reinforcing fibers having an improved multi-layer protective coating thereon. The multi-layer protective coating includes a boron nitride sublayer having a composition consisting essentially, in weight percent, of about 75–90% BN, 0–10% O and 0–14% C, and an oxidic overcoating consisting predominantly of an oxidic species selected from the group consisting of alumina and synthetic mica.

In a third aspect, the invention includes a method for treating inorganic fiber to improve the oxidation resistance and bonding characteristics thereof within an encapsulating ceramic matrix material which comprises the step of depositing onto the surface of the fiber a multi-layer protective coating comprising a boron nitride sublayer and an oxidic overcoating. The boron nitride sublayer has a composition consisting essentially, in weight percent, of about 75–90% BN, 0–10% O and 0–14% C, and the oxide overcoating consists at least predominantly of an oxidic species selected from the group consisting of alumina and synthetic mica.

In the preferred method, the boron nitride sublayer is deposited on the surfaces of the inorganic fiber by chemical vapor deposition, while the oxidic alumina or mica overcoating is deposited on the fiber by liquid coating followed by pyrolysis. A liquid coating comprising one or more organometallic precursors of an oxidic compound selected from the group consisting of alumina and synthetic mica is applied to the surface of the fiber, and the fiber is then heat treated to convert the precursors to the selected oxidic compound.

The application of an alumina or mica overcoating to BN-coated inorganic fibers appears to significantly enhance the performance of the BN coating or film. Without being bound by any particular explanation as to the mode of operation of the invention, it is presently believed that the oxidic overcoating protects the relatively soft BN subfilm during composite processing and/or acts as a getter to purify the BN subfilm during hot pressing and/or protects the BN subfilm from harmful chemical interaction with the matrix during hot pressing.

Alumina, for example, has a very low diffusion coefficient for oxygen and in the form of a continuous coating could function as an excellent oxygen diffusion barrier. It is also known to be reactive with $B_2O_3$ to form a refractory $Al_{18}B_4O_{33}$ mullite phase, or a moderately refractory $Al_4B_2O_9$ phase. In this way alumina could act as a boron oxide getter at the coating interface. This would have two effects: it could drive oxygen from the coating, purifying the BN, and could tie up the low-melting $B_2O_3$ phase, resulting in a more refractory interface.

Mica overcoatings, on the other hand, offer the potential for a second point of fiber debonding that imparts toughness to the composite material. Such a configuration is thought to reduce the exposure of the BN underlayer to reactive environments. In any case the advantages of the protective coating system of the invention in terms of the improved high temperature properties thereof will be apparent from the following description.

DETAILED DESCRIPTION

The invention is not believed to be limited in its application to any particular types of inorganic reinforcement fibers or ceramic matrix materials. In the case of the fibers, the presently preferred reinforcement materials are silicon carbide and silicon oxycarbide fibers, which are known to be subject to high temperature embrittlement if not protected. Nevertheless the multi-layer coatings of the invention will impart good fiber-pullout behavior for improved toughness, together with good coating stability, even where other fibers are employed.

Examples of alternative fibers include fibers of carbon, alumina, $B_4C$, BN, zircon, mullite, or spinel. Examples of the preferred silicon carbide-based fibers include Nicalon ® silicon oxycarbide fibers, commercially available from the Nippon Carbon Co. of Tokyo, Japan.

The selection a ceramic matrix material for reinforcement with fibers comprising multi-layer coatings in accordance with the invention is likewise not critical, although for applications requiring the best high temperature performance, refractory alkaline earth aluminosilicate glass-ceramics are normally preferred. Such glass-ceramics are disclosed, for example, in U.S. Pat. No. 4,615,987, and include glass-ceramics wherein the predominant crystal phase is selected from the group of anorthite ($CaO.Al_2O_3.2SiO_2$) and its pseudo-binaries with mullite ($3Al_2O_3.SiO_2$), cordierite ($2MgO.2Al_2O_3.5SiO_2$), barium osumilite ($BaO.2MgO.3Al_2O_3.9SiO_2$), albite solid solution ($Na_2O.Al_2O_3.6SiO_2$), $Al_2O_3$, $SiO_2$, $CaO.SiO_2$, and gehlenite ($2CaO.Al_2O_3.SiO_2$.

Other refractory alkaline earth aluminosilicate glass-ceramics include those comprising a predominant crystal phase consisting essentially of triclinic anorthite in admixture with at least one of mullite and alpha alumina, these glass-ceramics being disclosed in U.S. Pat. No. 4,755,489. Further, U.S. Pat. No. 4,464,475 discloses alkaline earth aluminosilicate glass-ceramics wherein the principal crystal phase is selected from the group consisting of barium osumilite, cordierite, and stuffed cordierite, the ions comprising the stuffing ions in the stuffed cordierite compositions being selected from the group consisting of Ba, Ca, Sr and Cs. Barium-stuffed cordierite glass-ceramics, in particular, exhibit relatively low coefficients of thermal expansion and high elastic moduli.

For somewhat less demanding applications, matrix materials comprising lithium or zinc aluminosilicate glass-ceramics may be selected. U.S. Pat. No. 4,554,197 describes the use of glass-ceramic matrix materials of this type, which may also contain magnesium but which are typically essentially free of $TiO_2$. These glass-ceramics are characterized by the presence of a principal crystal phase selected from the group consisting of beta-quartz solid solution (sometimes referred to as beta-eucryptite solid solution) and beta-spodumene solid solution.

Finally, the coated fibers of invention can be utilized for the strengthening and/or toughening of glass matrix materials, particularly including alkali-free alkaline earth aluminosilicate glasses. These glasses are preferably substantially free of alkali metal oxides such as $Na_2O$, $Li_2O$, and $K_2O$, and include one or more alkaline earth metal oxides selected from the group consisting of CaO, MgO, SrO and BaO.

The application of a boron nitride coating to provide a subfilm on the selected fiber reinforcement material can be carried out by conventional chemical vapor deposition techniques. As noted in U.S. Pat. No. 4,642,271, a fiber material such as Nicalon® silicon oxycarbide fiber tow may be coated in a vacuum chamber by contact with mixtures of boron and nitrogen source gases such as BCl₃, borazine and ammonia at an elevated temperature at which source compound decomposition and BN formation will occur directly on the surfaces of the fibers.

Alternative deposition procedures, including those involving the deliberate introduction of dissolved carbon (graphite) into the coating from a carbon source compound provided in the source gas mixture, may of course be employed. Any method providing adherent BN sublayers consisting at least predominantly of BN, e.g., at least about 70% BN by weight, is suitable. Additional constituents which may be present in these sublayers without adversely affecting coating performance include up to about 14% carbon and up to about 10% oxygen by weight.

A relatively large number of synthetic mica compositions known in the literature may be used for the successful mica overcoating of BN-coated fibers in accordance with the invention. The preferred mica overcoatings are synthetic fluormicas, most preferably synthetic potassium tetrasilicic fluormica ($KMg_{2.5}Si_4O_{10}F_2$) or potassium fluorphlogopite mica ($KMg_3AlSi_3O_{10}F_2$). However, other synthetic micas, including other normal fluorphlogopites, boron fluorphlogopites, subpotassic fluorphlogopites, lithia fluormicas, and alkaline earth disilicic and trisilicic fluormicas, may alternatively or additionally be used.

Oxidic fluormica compounds for fiber overcoating may be prepared by the controlled crystallization of glasses, as disclosed in U.S. Pat. Nos. 3,689,293, 3,732,087 and 3,756,838, and may be applied to fibers as precursor glass or crystalline powders. Alternatively, inorganic mica sols comprising these or other micas may be prepared as disclosed in U.S. Pat. No. 4,239,519 and the sols used to coat the fibers.

As previously noted, however, the deposition of an oxidic alumina or mica overcoating to BN-coated reinforcing fibers in accordance with the invention is most preferably accomplished through the use of solutions or liquid sols of organometallic source compounds for the overcoatings. While other methods of deposition such as vapor deposition, powder coating, gel coating or the like may alternatively be used for many of these materials, solution or sol coating insures minimal chemical or physical damage to the BN sublayer and offers excellent composition control, fiber coverage, and coating homogeneity for the more complex mica overcoating materials.

The preferred organometallic source compounds for the solution coating of fibers as described are the alkoxide compounds of aluminum, silicon, boron and the alkali and alkaline earth metals commonly included in the mica overcoatings. However, other organometallic compounds forming stable solutions or sols in aqueous or non-aqueous media may alternatively be used.

Alkoxide solutions can readily be converted to alkoxide gels upon exposure to gelling agents such as water, with the mica crystals then being developed directly in the gels by an appropriate heat treatment. Most preferably, the crystals are developed in situ on the fibers by first coating the fibers with the solutions, then inducing gelation of the solutions on the fibers, and finally heat-treating the fibers comprising the gelled coatings to convert the coatings to crystalline layers.

As known in the art, coated reinforcing fibers such as silicon carbide fibers can conveniently be incorporated into glass-ceramic matrix materials such as above described if the matrix materials are provided as glasses in particulate or powdered form. Such particulate matrix materials may readily be produced from glasses by drigaging, grinding and/or milling, with the glass powders thus produced being readily applied to the fibers in the form of liquid suspensions of the powders. Typically, these suspensions comprise dispersants and binder constituents in addition to the glass powders, and are applied by spraying or immersion of fibers or fiber tows or mats into the suspensions.

Fiber mats or tows impregnated with powdered glass as described may then be pressed or wound onto drums to provide green sheets or prepregs of the glass-impregnated fibers. These may then be stacked, if desired, and heated to achieve burnout of organics present in the coating vehicle.

Consolidation of the green prepregs or stacks thereof is typically accomplished by a hot pressing process during which the temperature is raised above the softening temperature of the glass and pressure is applied to eliminate voids in the material and produce a dense composite. In the case of glass-ceramic matrix materials, crystallization of the matrix material to effect conversion to a glass-ceramic matrix is usually achieved concurrently with consolidation in the course of the hot pressing process.

The invention may be further understood by reference to the following examples which set forth specific illustrative embodiments thereof.

Example 1

Coated Fibers

Inorganic fibers are first selected for treatment by a multi-layer coating process. The fibers selected are commercially available Nicalon® NLM 202 fiber tows, each tow consisting of approximately 500 SiC (silicon oxycarbide) fibers of substantially cylindrical cross-section. The individual fibers have diameters of about 10-15 microns, and as supplied include a polyvinyl acetate sizing material which is removed from the fiber surfaces by pyrolysis prior to the actual deposition of the multi-layer coating.

The selected fiber tows are provided with a boron nitride base layer by conventional commercially available processing. Processing is commercially available from the Synterials Company of Herndon, Va., USA. Fibers comprising a BN coating approximately 0.2 microns in thickness, coated over a 10 minute interval under a vacuum of 0.3 torr at 960° C., using reactant flow rates of 4.31 g/min BCl₃ and 0.77 g/min NH₃, are selected for further processing. The BN coatings include oxygen and free carbon impurities, but have compositions comprising in excess of 75% BN by weight.

Alkoxide sols for the application of alumina and synthetic fluormica overcoatings to the BN-coated fibers are next prepared. For a potassium phlogopite mica overcoating sol, 1.66 g (0.0237 moles) of potassium ethoxide, 8.13 g (0.0711 moles) of magnesium ethoxide, 4.84 g (0.0237 moles) of aluminum isopropoxide, and 14.78 g (0.071 moles) of silicon ethoxide are measured into a flask. To this mixture is added 375 ml of 2-methoxy ethanol and 25 ml of concentrated HNO₃. The alkoxide solution thus provided is stirred and warmed until all of the components dissolve.

Next, 1.76 g (0.0303 moles) of $NH_4F.HF$ is dissolved in 92 ml of methanol and 8 ml of $HNO_3$ in a separate flask. This methanol solution is then added to the alkoxide solution while the latter is being stirred and warmed. The alkoxide solution is clarified by this addition to yield a yellow colored, clear, non-viscous sol which thereafter is warmed and stirred for 1 to 2 hours.

Finally, 300 ml of 2-methoxy ethanol is added to the sol to yield a final volume of about 800 ml of product containing the precursor to about 0.0237 moles of mica. Thus this sol provides about 1.25 g of potassium fluorphlogopite mica for each 100 ml of solution.

For a potassium tetrasilicic fluormica overcoating sol, magnesium, silicon and potassium alkoxides are weighed into a flask in a glove box under nitrogen. Silicon tetraethoxide (12.2 g), magnesium diethoxide (4.18 g), and potassium methoxide (1.03 g) are dissolved in 286 ml of 2-methoxy ethanol together with 14 ml of concentrated $HNO_3$ (69% acid solution). The resulting mixture is refluxed under flowing nitrogen gas to provide a homogeneous solution.

Next 1.07 g of $NH_4HF_2$ is dissolved in 96 ml of methanol and acidified with 4 ml of concentrated $HNO_3$, the resulting mixture being added dropwise to the refluxing solution. This addition provides a clear yellow solution with no significant viscosity increase over that of the original 2-methoxy ethanol solvent. Little or no precipitation of crystalline mica occurs. The solution thus provided is then converted to a clear tetrasilicic potassium fluormica gel by allowing air hydrolysis of the solution to occur in an open container coincident with the evaporation of excess solvent from the solution.

The crystalline mica products derived from each of the mica sols or gels above described yield x-ray diffraction powder patterns manifesting strong characteristic sheet silicate features. Some residual glass is shown, but no crystalline impurities are readily detectable.

For an alumina overcoating sol, 8 g of aluminum isopropoxide is weighed out in a glove box and combined with 196 mls of ethanol in a 500 ml boiling flask. The mixture is then acidified by the addition of 10 ml of concentrated nitric acid. After refluxing for approximately 2 hour, a homogeneous $Al_2O_3$ sol which is clear and colorless to slightly yellow in color with slight white residue is produced.

Any of the three alkoxide solutions or gels produced as above described can conveniently be used to apply solution or gel coatings to BN-precoated fibers for alumina or mica overcoating. To apply the three overcoatings, BN-coated fibers are drawn through the selected sol or gel, preliminarily dried at 150° C. to remove excess solvent, fired and 275° C. to remove organic species, and then collected on a takeup spool. For the alumina and potassium fluorphlogopite mica preparations, this process is repeated once to double the thickness of the applied overcoating.

In the case of the alumina overcoating, no further firing is needed. However, for the fibers overcoated with the mica preparations, the coated fibers are transferred to a ceramic spool for further heat treatment to develop the mica crystalline phase in each coating. The wound fibers are heated at a rate of 10° C./min to 490° C., held for 20 minutes at that temperature, and finally cooled to room temperature. A reducing atmosphere of forming gas (92% nitrogen, 8% hydrogen) at a flow rate of 10 l/min is provided in the heating chamber during this treatment.

Examination of the coated fibers produced in accordance with the above process indicates that smooth, adherent multi-layer coatings of BN and overcoated alumina or mica are obtained. The alumina sol provides fully continuous overcoating coverage while the mica sol/gels provide coverage of at least 70-80% of the fiber surface.

Example 2

Ceramic Composite Fabrication

Silicon oxycarbide fiber tows comprising three different types of multi-layer coatings produced as described in Example 1 above are selected for incorporation into a glass-ceramic matrix composite article Fiber tows incorporating each of the three coating systems are first combined with a powdered alkaline earth aluminosilicate glass precursor for a glass-ceramic matrix material The precursor consists of a powdered calcium aluminosilicate glass having an oxide composition, in weight percent, of about 40.8% $SiO_2$, 39.7% $Al_2O_3$, 19.0% CaO, and 0 5% $As_2O_3$, and having an average particle size of about 10-15 microns for the milled glass. The composition of this glass is such that it can be converted to a highly crystalline anorthite glass-ceramic matrix material upon suitable heat treatment A suspension of the powdered glass useful for impregnating the silicon carbide fiber tows with the matrix powder is prepared by combining the powdered glass with a liquid vehicle comprising an alcohol/water solvent mixed with a polyvinyl butyral binder and a dispersant in conventional fashion. The tows are then continuously drawn through this suspension and wound onto a drum to form a cylindrical fiber layup.

After drying, the glass-impregnated fiber winding is cut from the drum and stretched flat, and preform sheets are cut from the flattened winding for subsequent processing. Suitably, the cut sheet samples are preliminarily heated to evaporate residual solvent materials therefrom and then processed through a burnout step to remove organic binders. Burnout comprises heating the samples for two hours in nitrogen or air at approximately 550°-650° C.

Panels of composite material are prepared from these preform sheets by stacking and consolidating the sheet stacks with heat and pressure. Stacks of twelve sample sheets in fiber-parallel alignment are consolidated by hot pressing the stacks under nitrogen to temperatures in the range of about 1200°-1360° C. at pressures in the range of about 1500-3000 psi. This treatment removes voids from the material and converts the glass powder matrix to a dense crystalline glass-ceramic matrix wherein the principal crystal phase is anorthite. The hot pressing does not appear to significantly degrade the multi-layer protective fiber coatings.

Composite samples produced in accordance with the above-described procedure are evaluated for resistance to embrittlement by a strength testing procedure during which they are tested in flexure for microcrack yield stress and ultimate flexural strength, both at ambient temperature (25° C.) and at elevated test temperatures up to 1300° C. In the high temperature flexural tests, the samples undergo deformation, microcracking, and ultimate failure under conditions where almost immediate sample embrittlement and weakening occur if unprotected silicon carbide fibers are used. Thus improvements in fiber protection can readily be evaluated in these tests.

In addition to low high-temperature strength, the extent of embrittlement of composites exposed to this testing is further indicated by changes in fracture habit. Tough, non-brittle samples show fracture characterized by fiber pullout from the matrix (a so-called fibrous fracture habit), whereas woody and, especially, brittle fracture habits suggest increasing levels of embrittlement. Woody fracture surfaces display some crack propagation parallel to the stress axis, indicating localized shear failure but without fibrous pullout, whereas brittle fracture surfaces display merely planar fracture surfaces typical, for example, of conventional glass.

Typical results of the flexural testing of composite panel materials produced in accordance with Example 2 are recorded in Table I below. Included in the Table for each of several numbered composite samples tested are an identification of the overcoating preparation employed to protect the silicon oxycarbide reinforcing fibers in that sample, whether alumina ($Al_2O_3$), potassium fluorphlogopite mica (KF mica), or potassium tetrasilicic fluormica (KT mica), and the hot pressing (Hot Press) conditions of peak temperature and pressure used for the consolidation and crystallization of the materials.

For each temperature (Test Temp.) used for flexural testing of the samples, test data including the microcrack yield stress ($\sigma_{mcy}$), the microcrack yield strain ($\epsilon_{mcy}$ or sample elongation at the point of microcracking), ultimate flexural strength ($\sigma_{ult}$), and the strain or elongation at the ultimate failure point ($\epsilon_{ult}$) are reported. All flexural testing is done on the strong or fiber reinforcement axis of the samples.

Finally, the fracture behavior observed for each of the samples tested is reported. The reported fracture data includes an indication of the principal failure mode(s) for each sample, whether in tension (T), compression (C), shear (S) or deformation (Def.), and the predominant fracture habit(s) observed, whether fibrous, woody, or brittle.

TABLE I

| Sample No. | Hot Press | Test Temp.(°C.) | $\sigma_{mcy}$ Ksi | $\epsilon_{mcy}$ (%) |
|---|---|---|---|---|
| 1 $Al_2O_3$ | 1360 °C./1500 psi | 25 | 17.5 | 0.14 |
|  |  | 1000 | 11.3 | 0.11 |
| 2 $Al_2O_3$ | 1200 °C./1500 psi | 25 | 19.3 | 0.15 |
|  |  | 1000 | 21.6 | 0.22 |
| 3 $Al_2O_3$ | 1200 °C./1500 psi | 25 | 35.8 | 0.23 |
|  |  | 1000 | 29.6 | 0.27 |
|  |  | 1200 | 12.7 | 0.17 |
|  |  | 1300 | 9.3 | 0.23 |
| 4 $Al_2O_3$ | 1250 °C./1500 psi | 25 | 34.0 | 0.21 |
|  |  | 1000 | 15.8 | 0.14 |
| 5 $Al_2O_3$ | 1200 °C./1500 psi | 25 | 42.3 | 0.25 |
|  |  | 1000 | 17.0 | 0.12 |
|  |  | 1200 | 14.2 | 0.13 |
| 6 $Al_2O_3$ | 1250 °C./1500 psi | 25 | 42.4 | 0.26 |
|  |  | 1000 | 13.3 | 0.26 |
|  |  | 1200 | 7.6 | 0.15 |
| 7 KF mica | 1200 °C./1500 psi | 25 | 41.7 | 0.25 |
|  |  | 1000 | 15.2 | 0.16 |
|  |  | 1200 | 6.6 | 0.08 |
| 8 KF mica | 1250 °C./1500 psi | 25 | 46.5 | 0.27 |
|  |  | 1000 | 19.0 | 0.16 |
|  |  | 1200 | 8.4 | 0.11 |
| 9 KT mica | 1250 °C./1500 psi | 25 | 19.8 | 0.14 |
|  |  | 1000 | 13.7 | 0.14 |
| 10 KT mica | 1250 °C./3000 psi | 25 | 14.7 | 0.11 |
|  |  | 1000 | 15.4 | 0.15 |
| 11 | 1200 °C./1500 psi | 25 | 39.4 | 0.23 |

TABLE I-continued

| | | | | |
|---|---|---|---|---|
| KT mica | | 1000 | 14.2 | 0.15 |
|  |  | 1200 | 8.5 | 0.12 |
|  |  | 1300 | 5.1 | 0.12 |
| 12 KT mica | 1250 °C./1500 psi | 25 | 22.7 | 0.14 |
|  |  | 1000 | 14.7 | 0.14 |

| Sample No. | Test Temp. | $\sigma_{ult}$ Ksi | $\epsilon_{ult}$ (%) | Fracture Mode/Character |
|---|---|---|---|---|
| 1 $Al_2O_3$ | 25 | 81.1 | 0.97 | T,S; fibrous |
|  | 1000 | 48.6 | 0.59 | T,S; fibrous |
| 2 $Al_2O_3$ | 25 | 87.0 | 0.90 | T,S; fibrous |
|  | 1000 | 107.4 | 1.22 | S,C,T; fibrous |
| 3 $Al_2O_3$ | 25 | 102.5 | 0.86 | T,S; woody & fibrous |
|  | 1000 | 101.6 | 1.08 | T,S; woody & fibrous |
|  | 1200 | 70.7 | 1.34 | Def,S,T; brittle-woody |
|  | 1300 | 42.4 | 1.78 | Def,S; brittle-woody |
| 4 $Al_2O_3$ | 25 | 133.2 | 1.13 | T,S; fibrous to woody |
|  | 1000 | 92.5 | 1.00 | T,S; fibrous to woody |
| 5 $Al_2O_3$ | 25 | 124.6 | 0.85 | T,S; brittle to fibrous |
|  | 1000 | 130.4 | 1.26 | T,S; woody to fibrous |
|  | 1200 | 71.7 | 0.79 | T,S; woody to fibrous |
| 6 $Al_2O_3$ | 25 | 119.7 | 0.84 | T,S; woody to fibrous |
|  | 1000 | 111.3 | 0.98 | T,S; woody to fibrous |
|  | 1200 | 70.9 | 0.77 | T,S; woody to fibrous |
| 7 KF mica | 25 | 136.1 | 0.89 | T,S; fibrous |
|  | 1000 | 92.2 | 1.01 | T,S; fibrous-woody |
|  | 1200 | 54.2 | 0.93 | T,S; fibrous-woody |
| 8 KF mica | 25 | 124.4 | 0.87 | T,S; fibrous |
|  | 1000 | 83.8 | 0.84 | T,S; fibrous |
|  | 1200 | 46.8 | 0.80 | T,S; fibrous-woody |
| 9 KT mica | 25 | 137.2 | 1.29 | T,S; fibrous |
|  | 1000 | 73.3 | 1.03 | T,S; fibrous |
| 10 KT mica | 25 | 109.7 | 0.98 | T,S; fibrous |
|  | 1000 | 69.4 | 0.84 | T,S; fibrous-woody |
| 11 KT mica | 25 | 112.2 | 0.83 | T,S; brittle-woody |
|  | 1000 | 74.5 | 0.86 | T,S; brittle-woody |
|  | 1200 | 36.7 | 0.85 | Def,S; brittle-woody |
|  | 1300 | 14.1 | 0.73 | Def,S; brittle-woody |
| 12 KT mica | 25 | 86.5 | 0.71 | T,S; brittle-woody |
|  | 1000 | 89.9 | 1.00 | T,S; brittle-woody |

The data reported in Table I above indicate that composites incorporating fibers with multi-layer coatings in accordance with the invention provide high temperature oxidation resistance which is superior to composites incorporating unprotected fibers, as well as to composites incorporating fibers with BN protective coatings alone. Table II below reports performance de, as for control samples having the matrix composition of the samples reported in Example 2, but comprising uncoated silicon oxycarbide fibers or silicon oxycarbide fibers coated with BN alone.

TABLE II - Prior Art Samples

| Sample/ Coating | Test Temp. (°C.) | $\sigma_{mcy}$ (Ksi) | $\epsilon_{mcy}$ (%) |
|---|---|---|---|
| Control (none) | 25 | 28–40 | 0.2–0.4 |
|  | 1000 | 28–32 | 0.15–0.25 |
| Control (BN) | 25 | 25–40 | 0.2–0 4 |
|  | 1000 | 18–35 | 0.2–0.3 |
|  | 1200 | 10–20 | 0.15–0.3 |
|  | 1300 | 5–10 | 0.1–0.2 |

TABLE II - Concluded

| Sample/ Coating | Test Temp. (°C.) | $\sigma_{ult}$ Ksi | $\epsilon_{ult}$ (%) | Fracture Mode-Habit |
|---|---|---|---|---|
| Control (none) | 25 | 80–120 | 0.6–1.4 | Fibrous |
|  | 1000 | 36–40 | 0.25–0.4 | Brittle/woody |
| Control (BN) | 25 | 70–90 | 0.7–1.25 | Fibrous |
|  | 1000 | 70–100 | 0.7–1.2 | Fibrous/woody |
|  | 1200 | 30–50 | 0.6–1.2 | Fibrous/Def. |
|  | 1300 | 5–15 | 0.4–0.6 | Def. |

Flexural test data such as reported in the above Tables suggest distinct high-temperature performance advantages for the composites provided with multi-layer protective coatings in accordance with the invention. Thus although the average room temperature properties for the inventive composites are comparable to those of the prior art composites containing BN-coated fibers, flexural performance for the latter composites at 1000° C. include ultimate strengths averaging 75–76 Ksi and ultimate strains averaging about 0.65%.

The inventive composites with either alumina or mica overcoating layers display significant high temperature strength improvements. Mica overcoated samples tested at 1000° C. have ultimate flexural strengths averaging approximately 74.5 Ksi with strains to failure averaging 0.86%. The alumina overcoated samples exceed even this performance with average ultimate strengths of 101.6 Ksi and strains to failure of 1.08%. Thus the latter composites show virtually no degradation in flexure properties from room temperature to 1000° C.

Scanning Auger analyses of multi-layer coatings on fibers provided in accordance with the invention suggest that the mica and alumina overcoating layers in these coatings may help to stabilize BN sub-layer composition. Analysis of oxygen content in the BN sub-layers indicate that average oxygen impurity levels are maintained at about 10% by weight. This is below levels frequently reached in unprotected BN-coated fibers and suggests that a good level of protection of the BN sub-layers is being provided by the oxidic overcoatings.

Composites fabricated using overcoated fibers in accordance with the invention can also exhibit excellent strength retention after prestressing and subsequent air oxidation at elevated temperatures of 650° C. and 1000° C. Composites with alumina overcoatings display retained room temperature tensile strengths of 75 to 90% of the original strength after prestressing to 1.5 times the microcrack yield point (i.e., 35–50 Ksi), followed by oxidation for 10 hours at 1000° C. Composites with mica overcoatings have demonstrated retained strengths of 50–90% of their original strength after similar prestressing and exposure.

Similar damage accumulation tests with prior art samples yield less than 20% strength retention in BN-coated samples. In fact, samples with BN coatings alone generally sustain an exposure loss of 20% in strength independent of prestress level.

As is evident from the foregoing description, then, the performance of the composites of the invention offers improved prospects for securing high temperature oxidation resistance sufficient for the design of load-bearing parts for heat engine applications.

While the invention has been particularly described above with respect to specific materials and specific procedures, it will be recognized that those materials and procedures are presented for purposes of illustration only and are not intended to be limiting. Thus numerous modifications and variations upon the compositions and processes specifically described herein may be resorted to by those skilled in the art within the scope of the appended claims.

We claim:

1. A fiber-reinforced ceramic matrix composite article exhibiting high-temperature strength and toughness comprising a ceramic matrix selected from the group consisting of glasses and glass-ceramics in which are disposed reinforcing inorganic fibers having a protective coating thereon, wherein:

the protective coating is a multi-layer surface coating comprising (i) a boron nitride sublayer having a composition consisting essentially, in weight percent, of about 75–90% BN, 0–10% O and 0–14% C, and (ii) an oxide overcoating consisting predominantly of an oxidic species selected from the group consisting of alumina and synthetic mica.

2. A fiber reinforced ceramic matrix composite article in accordance with claim 1, wherein the ceramic matrix is selected from the group of refractory alkaline earth aluminosilicate glass-ceramics.

3. A fiber reinforced ceramic matrix composite article in accordance with claim 2 wherein the ceramic matrix is an alkaline earth aluminosilicate glass-ceramic matrix wherein the predominant crystal phase is selected from the group of anorthite ($CaO.Al_2O_3.SiO_2$) and its pseudo-binaries with mullite ($3Al_2O_3.SiO_2$), cordierite ($2MgO.2Al_2O_3.5SiO_2$), barium osumilite ($BaO.2MgO.3Al_2O_3.9SiO_2$), albite solid solution ($Na_2O.Al_2O_3.bSiO_2$), $Al_2O_3$, $SiO_2$, $CaO.SiO_2$, and gehlenite ($2CaO.Al_2O_3.SiO_2$).

4. A fiber reinforced ceramic matrix composite article in accordance with claim 2 wherein the ceramic matrix is an alkaline earth aluminosilicate glass-ceramic matrix wherein the predominant crystal phase consists essentially of triclinic anorthite in combination with at least one of mullite and alpha alumina.

5. A fiber reinforced ceramic matrix composite article in accordance with claim 2 wherein the ceramic matrix is an alkaline earth aluminosilicate glass-ceramic matrix wherein the principal crystal phase is selected from the group consisting of barium osumilite, cordierite, and stuffed cordierite, the ions comprising the stuffing ions in the stuffed cordierite compositions being selected from the group consisting of Ba, Ca, Sr and $Cs_2O$.

6. A fiber reinforce ceramic matrix composite article in accordance with claim 1 wherein the ceramic matrix is a lithium, or zinc aluminosilicate glass-ceramic matrix wherein the principal crystal phase is selected from the group consisting of beta-quartz/beta-eucryptite solid solution and beta-spodumene solid solution.

7. A fiber reinforced ceramic matrix composite article in accordance with claim 1 wherein the ceramic matrix is an alkali-free alkaline earth aluminosilicate glass including at least one alkaline earth metal oxide selected from the group consisting of CaO, MgO, SrO and BaO and being essentially free of $Na_2O$, $Li_2O$, and $K_2O$.

8. A fiber reinforced ceramic matrix composite article in accordance with claim 1 wherein the reinforcing inorganic fibers are fibers having a composition selected from the group consisting of silicon carbide, silicon oxycarbide, carbon, alumina, $B_4C$, BN, zircon, mullite and spinel.

9. A fiber reinforced ceramic matrix composite article in accordance with claim 1 wherein the reinforcing inorganic fibers are silicon oxycarbide fibers.

* * * * *

UNITED STATES PATENT AND TRADEMARK OFFICE
CERTIFICATE OF CORRECTION

PATENT NO. : 5,418,194
DATED : May 23, 1995
INVENTOR(S) : S. B. Dawes; J. L. Stempin; D. R. Wexell It is certified that error appears in the above-indentified patent and that said Letters Patent is hereby corrected as shown below:

On the title page: item [22],
"Apr. 23, 1993" should be
"Apr. 23, 1990"

Col. 12, line 22, "$(CaO.Al_2O_3.SiO_2)$"   Claim 3
should be "$(CaO.Al_2O_3.2SiO_2)$"

Col. 12, line 26, "$bSiO_2)$"   Claim 3
should be "$6SiO_2)$"

Col. 12, line 43, "reinforce"   Claim 6
should be "reinforced"

Signed and Sealed this

Third Day of October, 1995

Attest:

BRUCE LEHMAN

*Attesting Officer*   Commissioner of Patents and Trademarks